Aug. 18, 1925.
A. SONSTHAGEN
1,550,183
SWEETMEAT COATING MACHINE
Filed July 23, 1923   2 Sheets-Sheet 1
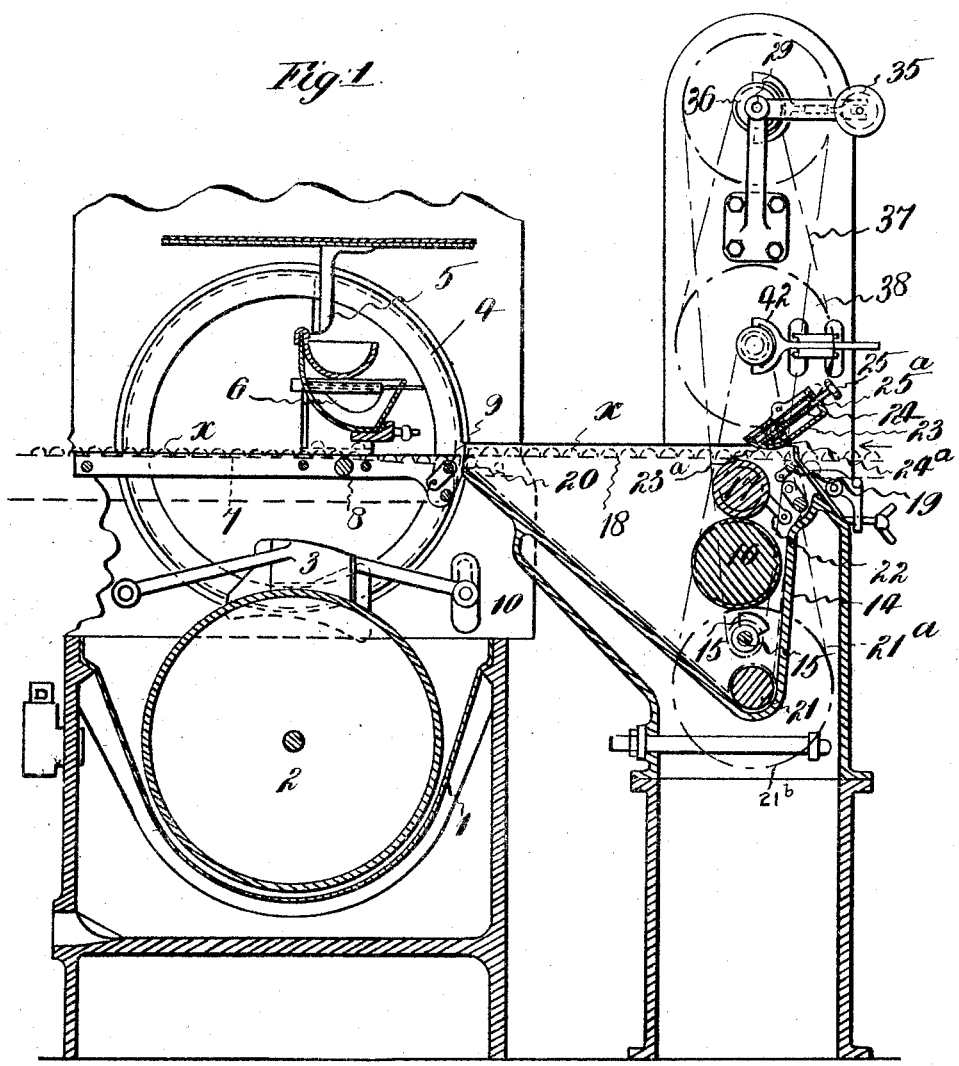

Aug. 18, 1925.
A. SONSTHAGEN
1,550,183
SWEETMEAT COATING MACHINE
Filed July 23, 1923    2 Sheets-Sheet 2
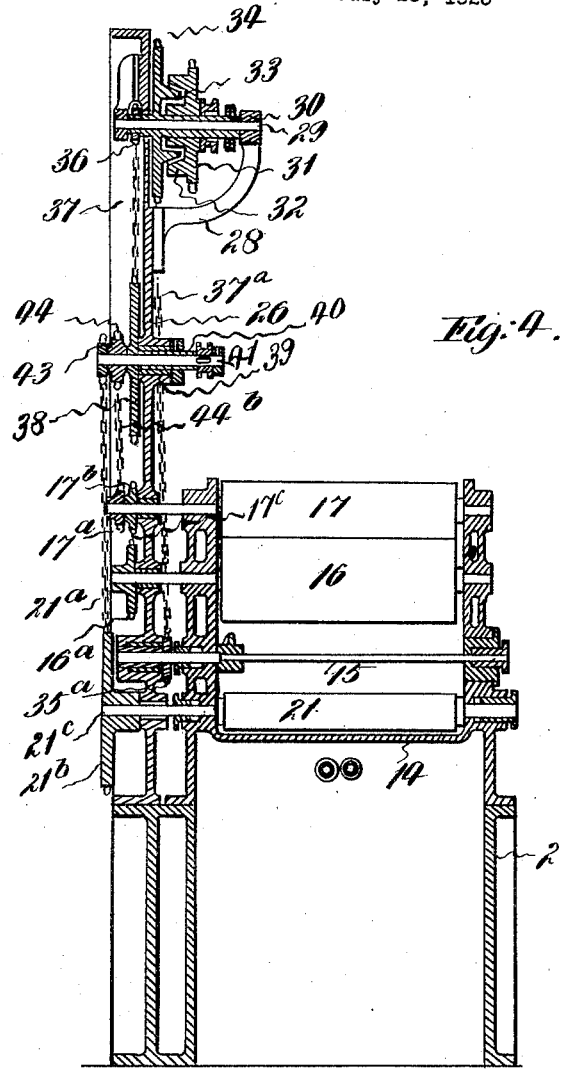
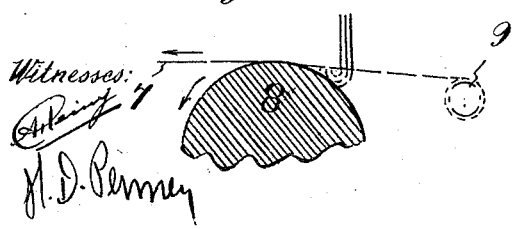
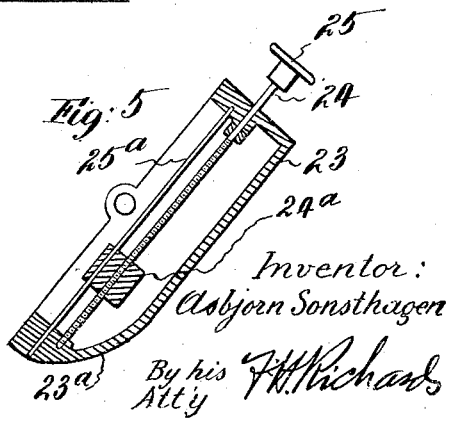

Patented Aug. 18, 1925.

1,550,183

UNITED STATES PATENT OFFICE.

ASBJORN SONSTHAGEN, OF LONDON, ENGLAND.

SWEETMEAT-COATING MACHINE.

Application filed July 23, 1923. Serial No. 653,331.

*To all whom it may concern:*

Be it known that I, ASBJORN SONSTHAGEN, a subject of the King of Norway, residing in London, England, have invented certain new and useful Improvements in Sweetmeat-Coating Machines, of which the following is a specification.

This invention relates to sweetmeat coating machines and refers to machines of the so-called "Enrober" type in which the cores or bodies to be coated are placed upon a conveyor and passed through a stream of the coating material.

With machines of this type where the coating material is in a thick or very viscid condition, it is difficult to secure the proper coating or covering of that portion of the core or body in contact with the conveyor, usually of openly spaced wire work or the like.

The present invention has for its object certain improvements in machines of this type designed to secure the proper coating of the underside of the cores or bodies with thick coating material, and according to which the material when applied to the cores is in a whirling or churning condition.

In order that the invention may be the better understood reference is made to the accompanying drawings, in which:—

Fig. 1 is a longitudinal section of a machine embodying the present invention,

Fig. 2 is a sectional view showing certain details,

Fig. 3 is an end view of the parts shown in Fig. 2,

Fig. 4 is a transverse section,

Fig. 5 is a longitudinal section of the device for preventing the lifting of the cores during the coating of the underside thereof, Fig. 6 is a view showing more clearly the coating operation.

Referring to the accompanying drawings in which the invention is shown as applied to a machine of known form and construction comprising a chocolate trough or receptacle 1 having therein an elevating drum 2 by which the material is taken from the trough 1, being removed from said drum by means of a scraper 3, by which it is transferred to the interior of an annular body 4. A second scraper 5 engages the inner surface of the rotating annular body 4 and causes the chocolate to be discharged into a trough 6 from which it falls in a stream upon the cores or centres $x$ upon the wire band or conveyor 7. Disposed beneath and contacting with the conveyor band 7 is a roller 8 the centre of which is so arranged with respect to the line of the chocolate falling from trough 6, that the periphery of roller 8 lies somewhat in front of said stream. The material falling upon the cores $x$ passes through the conveyor and adheres to and is carried forward by the surface of the roller, a certain amount also adhering to and being carried along by the band 7, which, meeting the material on the roller produces a churning or whirling motion, as illustrated more particularly in Fig. 6 of the drawings, the material ultimately being pressed through the interstices of the band and applied to the bottom of the cores. At the same time the whirling or churning movement causes any air, which might otherwise prevent the proper coating of the cores, to be expelled.

The speed of the roller 8 is such that its peripheral speed is somewhat higher than the speed of the band 7, and in order that the band may press with sufficient force upon the roller to prevent its being lifted therefrom by the material, the line of the upper run of the said band is changed by lowering it somewhat between the guide roller 9 and roller 8. The guide roller 9 comprises a length of pinion wire the teeth of which engage the interstices of the band supported at its ends by the side frames 10 of the machine.

In order to prevent the sagging of the guide roller 9 under the strain of the band 7 the said roller has formed, by turning or in any other suitable manner, plain portions 11 with which engage projections 12 formed upon a plate 13 supported from the sides of the frame of the machine.

As the chocolate used for coating the bodies of the cores is usually of comparatively thin consistency in order to secure a better appearance and finish it is advisable in order to ensure the proper coating of the bottom to first apply a coating of thicker chocolate. This may be done by means of the apparatus shown to the right of Fig. 1, which apparatus may, however, be used alone for coating the bottoms of the cores the coating of the bodies of which may be subsequently completed in any other machine.

The apparatus referred to comprises a suitably jacketed receptacle 14 having a stirrer 15 and roller 16 partly or fully immersed in the fluid material. Contacting with the roller 16 is a second roller 17 by which the material is elevated and applied to the undersurface of the band 18 which band passes over a pinion roller 19 similar to roller 9 previously referred to. Other rollers 20, 21 guide the band through the container the roller 21 being driven by means of a chain 21$^a$ passing over a chain wheel 21$^b$ upon the spindle 21$^c$ of said roller.

As in the former case the band 18, in order to cause it to press upon roller 17, is slightly lowered at the entrant end of the device.

As it is important that the amount of material supplied to the bottom of the cores shall be regulated an adjustable scraper, indicated by 22, is provided whereby the thickness of the coating upon roller 17 may be adjusted.

In order to prevent the cores being lifted off the band 18 there is pivotally mounted above the cores a body 23 having the lower end rounded or curved as shown at 23$^a$ which end rests upon the cores as shown in Fig. 1. The body 23 is formed hollow and has running vertically through it a screwed spindle 24 operable by means of the milled head 25.

Engaging the spindle 24 is a nut 24$^a$ designed to act as a weight said nut being prevented from rotating whilst spindle 24 is rotated by means of a guide 25$^a$ passing through a hole in the nut 24$^a$. By adjusting the position of the nut closer to or further away from the pivot of the body 23 the pressure upon the cores may be adjusted with great nicety.

26 indicates a vertical frame secured to the base 27 supporting the receptacle 14 to the upper end of which is secured a bracket 28 supporting one end of a spindle 29 the opposite end being supported in a bearing formed upon the aforesaid frame 26.

Freely mounted on spindle 29 is a sleeve 30 upon which is freely mounted a chain wheel 31 receiving motion from any suitable source of power. The chain wheel 31 has secured to or formed integrally with it a clutch member 32 co-operating with a second clutch member 33 having a chain wheel 34 said chain wheel 34 being secured to sleeve 30. A hand lever 35 is provided to operate the clutch member 32. Also secured to sleeve 30 is a chain wheel 36.

37$^a$ indicates a chain passing over a chain wheel 34 and around a chain wheel 35$^a$ attached to the spindle of the stirrer 15.

Passing over the chain wheel 36 is a chain 37 by which motion is imparted to a wheel 38 supported in a bearing 39 upon the frame 26 said wheel forming part of a sleeve 40 mounted upon a spindle 41 to which it may be clutched by means of the hand operated clutch 42. Secured to spindle 41 are two chain wheels 43, 44, which respectively operate, by means of chains 21$^a$ and 44$^b$, the chain wheel 21$^b$ of the roller 21 and a chain wheel 17$^a$ upon the spindle of roller 17. The spindle of roller 17 has secured to it a second chain wheel 17$^b$ over which passes a chain 17$^c$ actuating a chain wheel 16$^a$ upon the spindle of roller 16.

Instead of a roller a fixed or movable body having an inclined surface may be employed or the roller may dip into a trough adapted to retain sufficient material for the coating of the bottoms.

The effective churning motion is dependent to some extent on the amount of coating material elevated by the roller. Excess of material decreases the effect and means are needed to regulate this amount of material.

An independent supply of coating material may be provided for the surface of the roller, for instance a pump, which may form part of the trough into which the roller dips.

A scraper or scrapers may be provided for the roller to keep it clean or to free it from superfluous coating material and the tray may be arranged to empty in any convenient manner.

The described arrangement may be used as a separate machine to coat goods on one side only. In such case it is preferred to let the wire band itself elevate the coating material from the container. Means would be needed to adjust the amount of the elevated material and in order to use thick coating material it would be necessary to have special means to apply a slight pressure that may be adjustable on top of the cores to prevent the same from simply floating on the elevated material. The cores should preferably be fed forward to the wire band at the same speed as the motion of the wire band itself. The cores should preferably touch each other while carried forward to the wire band thereby making the whole row of cores help push each other into the coating material as elevated by the aforesaid wire band.

The arrangement may be modified as found necessary or desirable.

Claims—

1. Means for coating the bottom of cores or centres of sweetmeats, comprising an open flexible support for the cores, a roller contacting with the underside of said support, said support pressing against said roller with a force additional to the weights of the material, cores and support, means for supplying material to the surface of the roller and means for driving the roller at such speed that its peripheral speed is different to the lineal speed of the support whereby the material is pressed through the support on to the cores and a whirling or churning condition is produced in the material at this point.

2. Means for coating the bottom of cores or centres of sweetmeats comprising an open flexible support for the cores, a roller contacting with the underside of said support, said support pressing against said roller with a force additional to the weights of the material, cores and support, means for supplying material to the surface of the roller, means for driving the roller at such speed that its peripheral speed is different to the lineal speed of the support whereby the material is pressed through the support on to the cores and a whirling or churning condition is produced in the material at this point, and means for holding the cores down upon the support during the coating.

3. Means for coating the bottom of cores or centres of sweetmeats comprising an open flexible support for the cores, a roller contacting with the underside of said support, said support pressing against said roller with a force additional to the weights of the material, cores and support, means for supplying material to the surface of the roller and means for driving the roller at such speed that its peripheral speed is quicker than the lineal speed of the support whereby the material is pressed through the support on to the cores and a whirling or churning condition is produced in the material at this point.

4. Means for coating the bottom of cores or centres of sweetmeats comprising a reservoir for the coating material, an open band having a lower run immersed in the material in said reservoir, an upper run supporting the cores, a roller contacting with the undersurface of said band, said band pressing against said roller with a force additional to the weights of the material, cores and support, means for supplying material to the surface of the roller, and means for driving the roller at such speed that its peripheral speed is quicker than the lineal speed of the band whereby the material is pressed through the support on to the cores and a whirling or churning condition is produced in the material at this point.

In testimony whereof I have hereunto set my hand.

ASBJORN SONSTHAGEN.